April 20, 1965 W. M. MAY ETAL 3,179,201
MOTOR VEHICLE
Filed Feb. 20, 1962 4 Sheets-Sheet 3
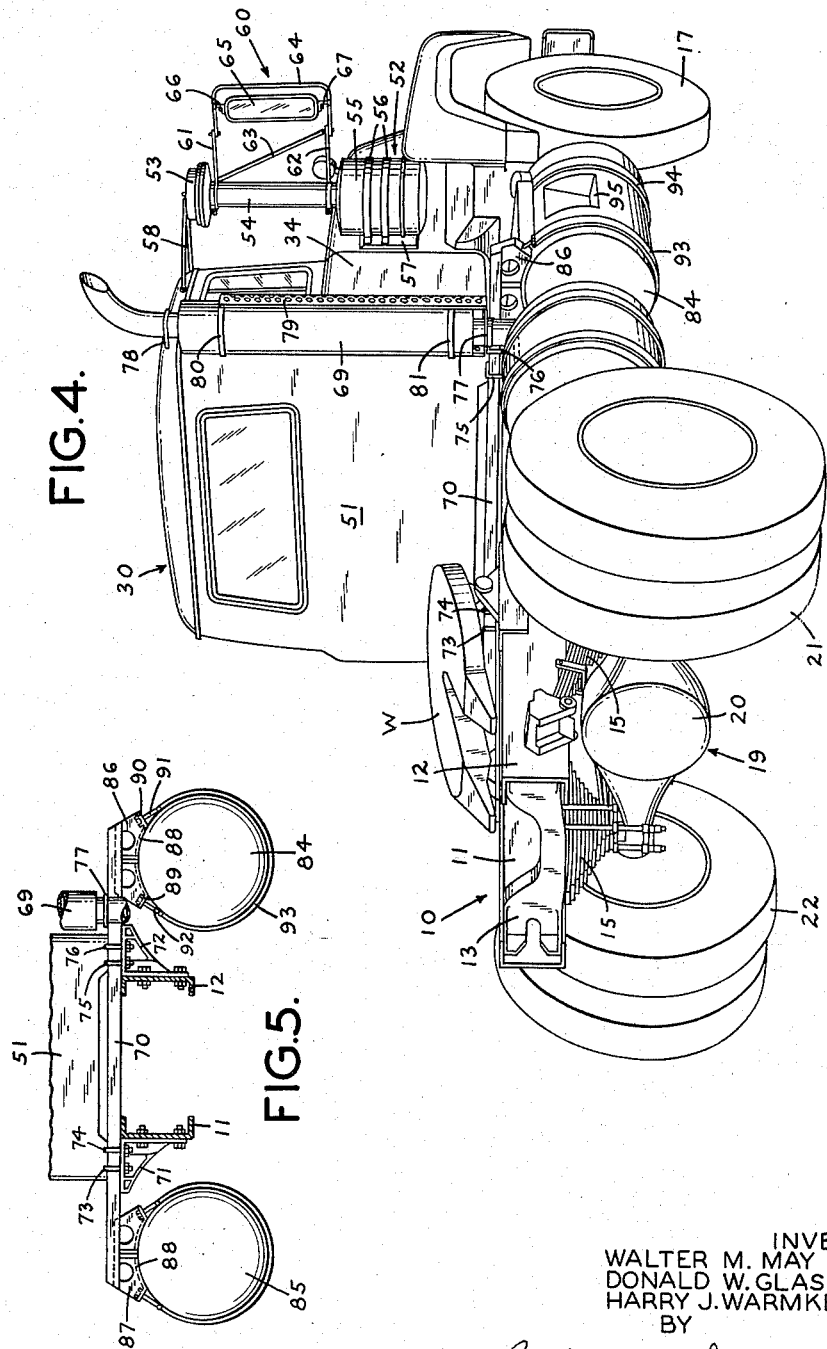
INVENTORS:
WALTER M. MAY
DONALD W. GLASENAPP
HARRY J. WARMKESSEL
BY
THEIR ATTORNEYS

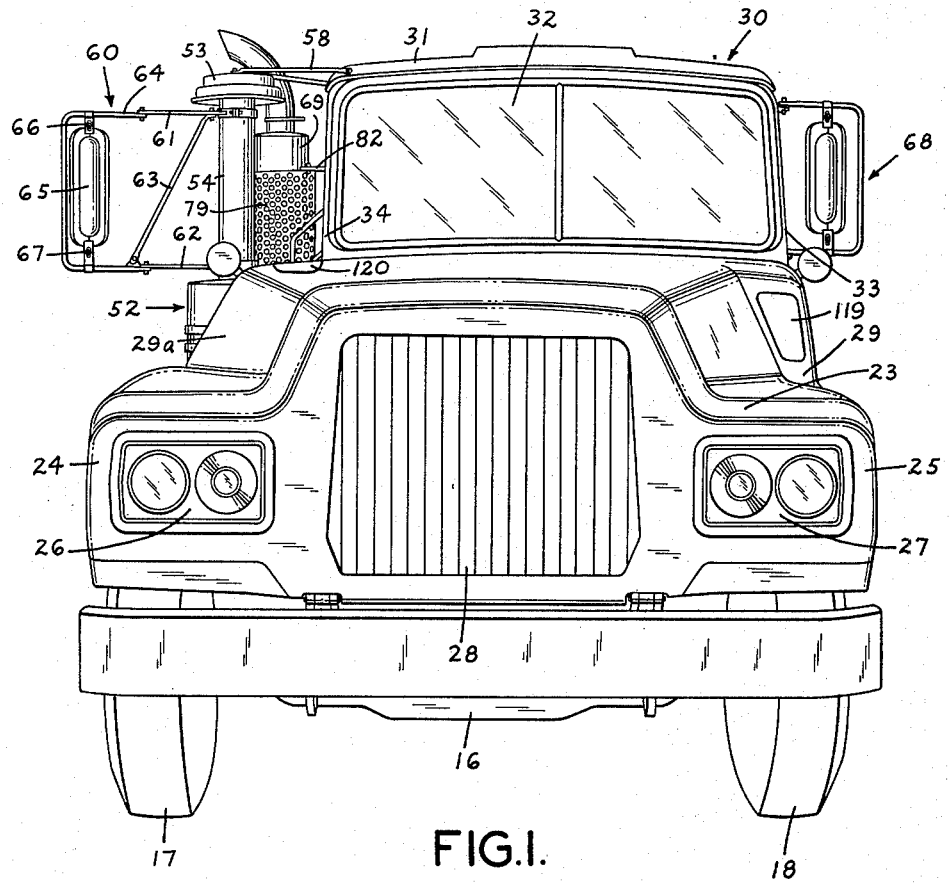

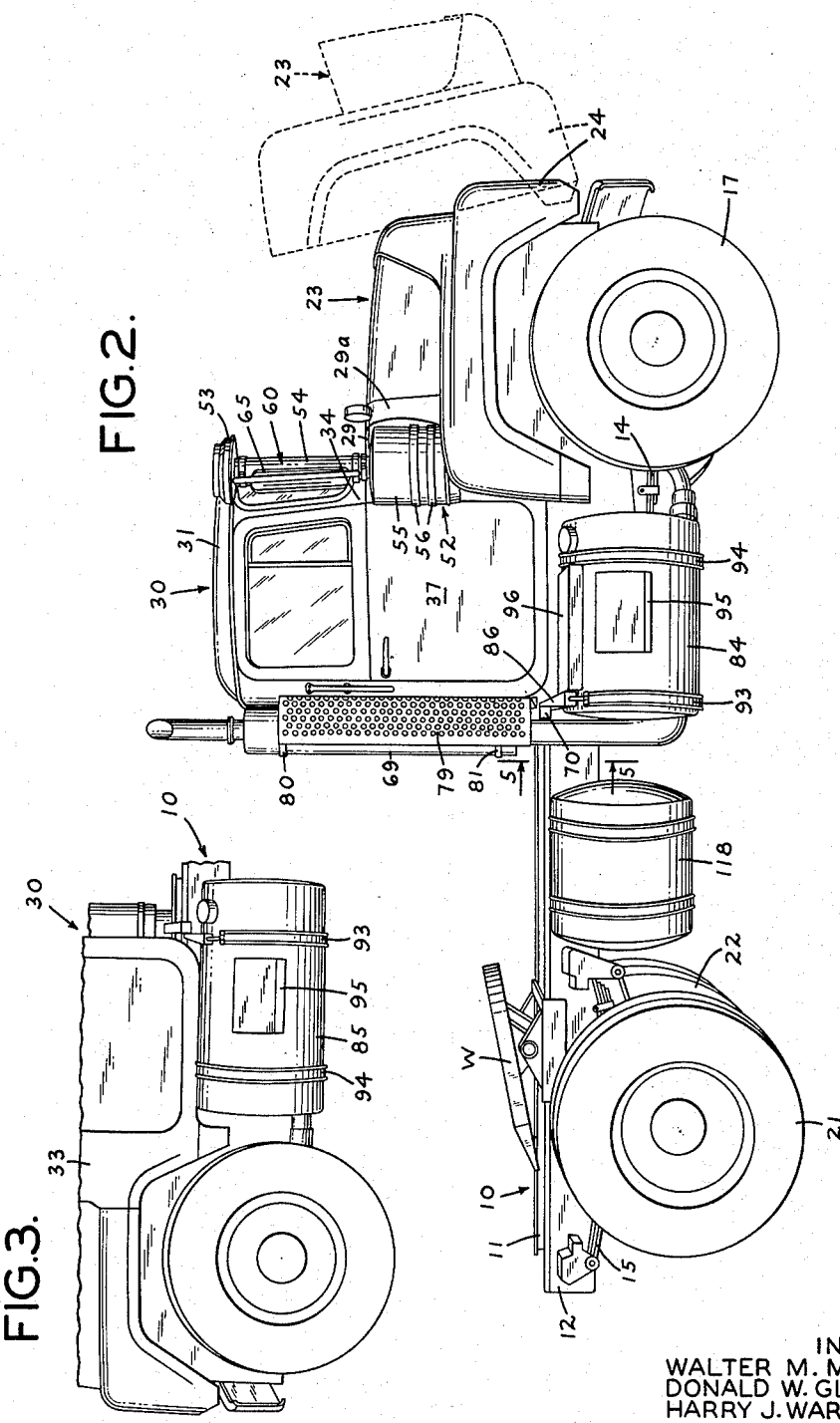

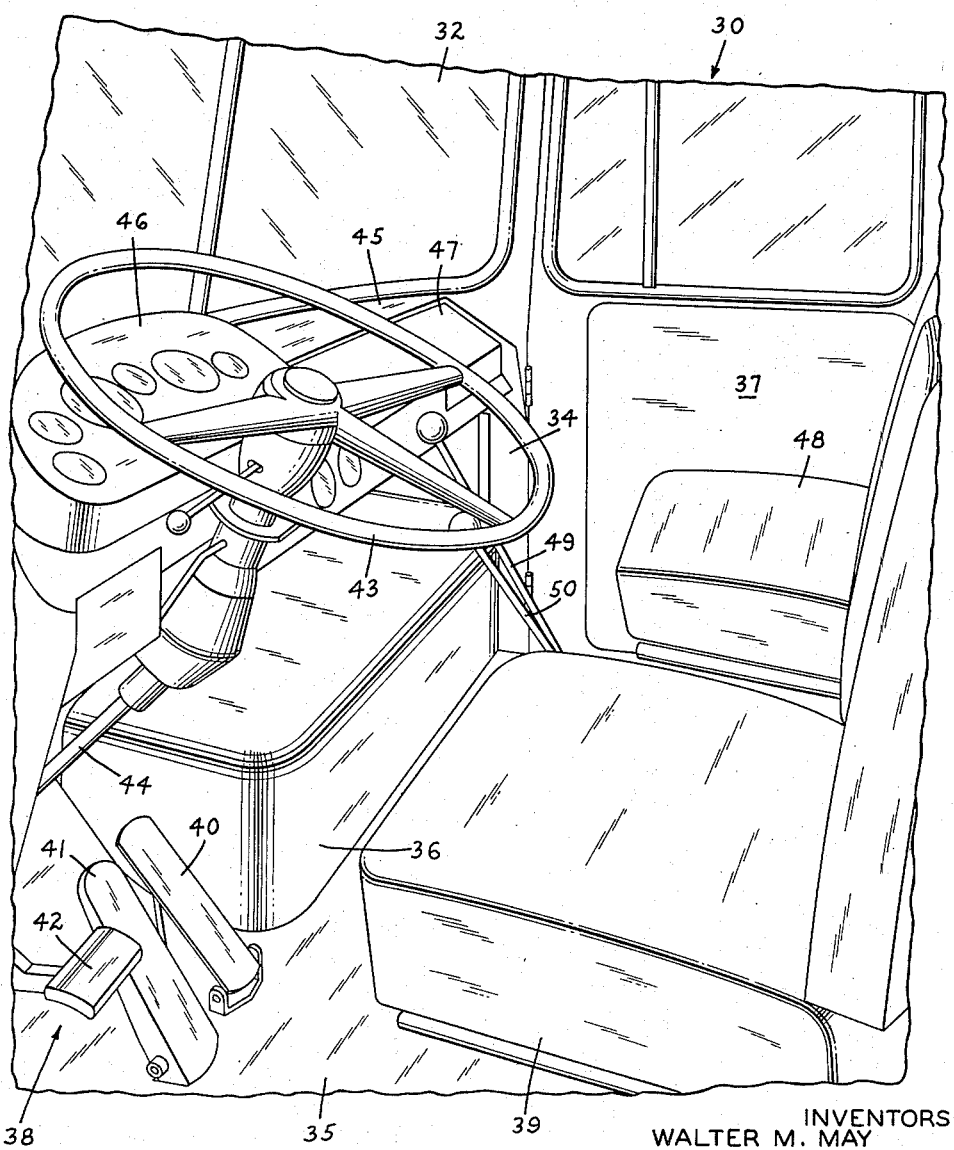

United States Patent Office 3,179,201
Patented Apr. 20, 1965

3,179,201
MOTOR VEHICLE
Walter M. May, Donald W. Glasenapp, and Harry J. Warmkessel, Allentown, Pa., assignors to Mack Trucks, Inc., Plainfield, N.J., a corporation of New York
Filed Feb. 20, 1962, Ser. No. 174,426
3 Claims. (Cl. 180—69)

This invention relates to improvements in motor vehicles, and it relates particularly to improvements in trucks and tractors for tractor-trailer combinations.

The design and production of truck-type vehicles, especially tractor trucks, is limited and hampered by many factors beyond the control of the engineer and the manufacturer. Almost all States have laws governing and limiting the over-all length, width and load-carrying capacity of trucks and tractor-trailer combinations. In order to carry the maximum cargo within the limits provided by law, the trailer must be as long as possible with the result that the over-all length of the driver's cab and the hood, if any, on the vehicle must be kept at a minimum.

With the large displacement, high-torque engines required in such tractors, it has been difficult to keep the over-all length and width of the cab within the maximum limitations available. One solution has been to mount the cab of the vehicle over the engine and provide a tunnel extending lengthwise of the cab in which the upper portion of the engine is housed. Access is had to the engine by mounting the cab for tilting or other movement relative to the frame. While such tilting cab structures are satisfactory and are widely used, they also are expensive for the reason that the cab must be a rigid, self-sustaining structure and expensive mechanisms must be provided for counterbalancing or raising the cab relative to the frame. Also, all controls must be flexible or capable of being disengaged to allow the cab to tilt. So long as the engine of the vehicle is relatively narrow in transverse width, e.g., an in-line engine, it can be housed in a tunnel of reasonable size in the floor of the cab while still leaving room for the driver and his assistant and for the operating controls of the cab.

When a different type of engine, such as a high-torque V-type engine of high-piston displacement is to be used in such a tilting cab vehicle, the problem becomes much more difficult for the reason that such engines are very wide and while they may be lower in over-all height, they require such a wide tunnel in the cab that the space for the driver and his assistant is greatly reduced. The cab cannot be made sufficiently wide to compensate fully for the wider tunnel due to width regulations. Moreover, if the cab is made wider, less space is available for such externally-mounted accessories as the air cleaner for the engine, the exhaust stack, side-view mirrors and the like, which are essential to the operation of the vehicle.

In accordance with the present invention a truck or tractor vehicle is provided which overcomes the disadvantages of the vehicles referred to above and enables a V-type, large piston displacement and high-torque engine to be used while keeping the over-all length and width of the cab and associated elements within the limits imposed by State regulations and maximum trailer length.

More particularly, in accordance with the present invention the new vehicle includes a hood for covering the forward portion of the engine and a fixed driver's cab mounted rearwardly of the hood and having a relatively short tunnel hood therein providing space for the rear portion of the engine, the cab being offset with respect to the longitudinal center line of the frame and engine so that the hood in the cab has one side adjacent to one side of the cab and its other side spaced from the opposite side wall of the cab to provide space for the driver's controls including the steering wheel and various pedals, parking brake and the like. In this way, despite the fact that the tunnel within the cab is wider than normal, it is relatively short and shallow so that the assistant driver's seat can be mounted behind the rear wall of the tunnel a sufficient distance to provide room for the assistant driver's legs and feet. The space between the tunnel and the opposite side of the cab is wide and deep enough to provide the necessary foot room and space for the pedal and other controls for the vehicle.

Another aspect of the off-set cab arrangement is that space is provided on the assistant driver's side of the cab for the external mounting of an air cleaner for the engine thereby producing a symmetrical structure in which the air cleaner can be mounted within the transverse width limits of the hood. Inasmuch as the air cleaner is mounted outside of the cab, it can serve as a support for a rear-view mirror which is readily visible to the driver for viewing the road without substantial restriction by the trailer being hauled by the tractor.

The offset cab improves visibility around vheicles ahead without pulling out of the driving lane and it also puts the driver closer to his own left hand mirror for much better visibility to the rear.

In order to reduce the load carried by the cab and thus simplify its structure and reduce its weight and cost, the vehicle is provided with a cross-frame member adjacent the back panel of the cab and mounted on the frame of the vehicle, the cross-frame member having its ends extending outwardly beyond the frame and serving to support the rear of the cab and the fuel tanks for the engine of the vehicle on one or both sides of the frame below the cab. The cross-frame member also supports the exhaust stack for the engine and thus disposes it within the area available for the cab and in a position to direct the exhaust gases away from the cab.

Additional space is conserved by forming the steps for entering the cab in and on the gas tanks.

Other features and advantages of the structure will be apparent from the following description and accompanying drawings in which:

FIGURE 1 is a front elevational view of a typical tractor truck embodying the present invention;

FIGURE 2 is a side elevational view of the vehicle;

FIGURE 3 is a side elevation of a portion of the vehicle viewed from the opposite side than that of FIGURE 2;

FIGURE 4 is a rear perspective view of the vehicle;

FIGURE 5 is a view in section taken on line 5—5 of FIGURE 2;

FIGURE 6 is a perspective view of the interior of the vehicle cab with portions of the cab broken away.

The vehicle chosen for purposes of illustration of the present invention is a tractor for hauling a trailer of the box or other type. As illustrated, the vehicle includes a strong frame 10 made up of a pair of longitudinally extending channel members 11 and 12 with suitable cross bracing members 13, etc., spaced along the length of the frame. The vehicle may have any desired type of suspension, such as, for example, leaf springs 14 and 15 mounting, respectively, the front axle 16 and the front steering wheels 17 and 18 and a rear axle 19 including a differential 20 and having single or dual wheels 21 and 22. Any suitable type of shackles or supports for mounting the springs on the frame may be used. Any suitable type of propeller shaft and transmission may be provided for driving the rear wheels, as may be desired.

In the tractor illustrated, a high piston displacement, high torque spark or compresison ignition V-8 engine together with its accessories, not shown, is mounted at the forward portion of the frame.

As best shown in FIGURES 1 and 2, the engine and the radiator therefor are housed in a unitary assembly of a hood 23 and fenders 24 and 25 in which the headlights 26 and 27, radiator shutter 28 and the like are mounted. The hood and fender assembly may be formed of metal but preferably the entire assembly is molded of resin-bonded fiberglass to conserve weight and to provide a rigid and vibration-resistant structure of good heat-insulating and sound-absorbing characteristics. The shapes of the hood and the fenders can be modified as desired.

The hood merges into a cowl portion 29 on the front of the driver's cab 30 and is movable relative to the cab, as shown in dotted lines in FIGURE 2 to uncover the radiator and engine of the vehicle for servicing or repair. The top 31 and the windshield 32 of the cab 30 are offset from the longitudinal center line of the frame and the engine as viewed in FIGURE 1. The side panel 33 of the cab 30 on the driver's side is disposed about in the plane of the outer edge of the left-hand fender 25, while the side panel 34 of the cab on the assistant driver's side is disposed about in a vertical plane containing the outside of the frame channel member 12. Both side panels of the cab 30 are provided with the doors to permit entry and exit from the cab.

A V-type engine is substantially shorter in over-all length than an in-line engine of the same displacement or torque output so that the hood 23 can be relatively short in a fore-and-aft direction thereby permitting the cab to be made long enough to provide space therein for the seats for the driver and the assistant driver and the controls for the vehicle. To house the rear portion of the engine, as shown in FIGURE 6, the floor 35 of the cab has a removable tunnel or internal hood 36 which extends rearwardly from the front fire wall in the floor of the cab and terminates about at the front edge of the door 37 on the assistant driver's side of the cab. One side of the tunnel 36 may be covered or closed by the side panel 34 of the cab or it may have a separate side wall closely adjacent to or abutting the side panel 34. By mounting the internal hood or tunnel 36 in offset relation with respect to the center line of the driver's cab 30, a space 38 is provided in front of the driver's seat 39 for the accelerator pedal 40, the brake pedal 41 and the clutch pedal 42. Also, space is provided for the steering wheel 43 and the steering shaft 44 which may be supported on a windshield bar 45 forming a structural member of the cab and extending between and connecting the panels 33 and 34 and forming the bottom sill for the windshield. The windshield bar 45 is a hollow sheet metal structure installed primarily as a transverse spacer between the hinge posts and serves to support the instrument panel 46 and house the glove compartment 47. It may also support the heater, not shown, in a position between its lower edge and the top of the tunnel 36.

An assistant driver's seat 48 is mounted in spaced relation to the rear wall of the tunnel 36 and the gear shift levers 49 and 50 are mounted between the seats 39 and 48. With this arrangement, the over-all length from the front of the hood to the back panel 51 of the cab can be kept within space limitations determined by State regulations governing the over-all length of a tractor and trailer.

Inasmuch as the top portion 31, side panels 33 and 34 of the cab, the windshield and the structures mounted within the cab are offset with respect to the longitudinal center line of the frame of the vehicle, space is available behind the fender 24 and the end of the cowl 29 on the assistant's side for mounting an external air cleaner 52. As best shown in FIGURES 2 and 4, the air cleaner includes a dome 53 having a downwardly-directed inlet communicating with a pipe or stack 54 through which air flows into the air cleaner chamber 55 and therefrom to the manifold or manifolds of the engine. Straps 56 and a mounting block 57 on the cowl 29 support the chamber 55 behind the laterally extending end portion 29a of the cowl and also inside and slightly forward of the rear end of the fender 24 to protect the air cleaner against damage. A bracket 58 extends between the top of the cab 30 and the top of the dome 53 to afford additional support to it.

An otherwise unsymmetrical appearance of the cab, when viewed from the front, is eliminated by the outboard mounting of the air cleaner.

In accordance with the present invention, the air cleaner is utilized as a support for a rear-view mirror 60. To that end, the pipe 54 carries upper and lower arms or brackets 61 and 62 connected by a diagonal brace 63 on which a C-shaped frame 64 is pivotally mounted. A mirror 65 is supported by means of adjustable pivots 66 and 67 at its upper and lower ends on the horizontal arms of the frame 64. Inasmuch as the mirror is supported for movement around horizontal and vertical axes, it is easily adjusted and can swing back out of the way without being damaged if it should strike an obstruction.

Another rear-view mirror 68 can be mounted on the driver's side of the cab 30 in the usual way.

Large displacement engines require large capacity and size exhaust stacks and mufflers. They usually are mounted so that the exhaust gases are discharged above the top of the cab to keep the exhaust gases away from the road and from other vehicles traveling therealong.

In accordance with the present invention, a muffler and exhaust stack 69 is mounted ahead of the trailer swing arc and behind and on the right-hand side of the vehicle as viewed in FIGURE 4 to the rear of the assistant driver's door (see FIGURES 2 and 4). In order to support the muffler and the rear of the cab without putting an unnecessary strain on the cab, a tubular cross-frame member 70 is mounted on top of the frame 10 by means of angle brackets 71 and 72 and U-bolts 73, 74, 75 and 76 engaging in the angle brackets 71 and 72. Opposite ends of the cross-frame member 70 project outwardly beyond the frame members 11 and 12. One end of the frame member 70 on the assistant's side of the cab supports the lower end of the muffler and exhaust stack 69. U-bolts 77, straps or the like connect the stack 69 to the member 70 so that substantially all of the weight of the exhaust stack is carried thereby. For stability, the upper end of the stack is also supported by means of a flexible strap 78 secured to the cab at the roof or adjacent thereto. A shield or guard of perforated metal 79 is mounted in spaced relation to the front and outside of the stack 69 to prevent the assistant driver from being burned when he enters or leaves the cab. The shield 79 may be mounted on the exhaust stack 69 by means of straps 80 and 81 and by means of bracket 82 secured to the cab (FIGURE 1).

Fuel tanks 84 and 85 are supported on opposite sides of the vehicle frame 10 below the cab 30. As best shown in FIGURE 5, each end of the frame member 70 carries brackets 86, 87 which are bolted or welded thereto and have an arcuate undersurface 88 conforming to the shapes of the tanks 84 or 85. Each bracket is provided with flanges 89 and 90 around its periphery to receive bolts 91 and 92 and provide seats for the nuts on the bolts to tighten a metal hoop or strap 93 around the rear end of each tank.

The front end of each tank is supported by means of other hoops or straps 94 secured to conventional saddle type brackets in turn mounted to the frame members of the vehicle. In this way, large-capacity fuel tanks for the vehicle can be supported from the frame and the cross-frame member outboard of the frames and within the frontal area of the cab. Moreover, as shown in FIGURES 2, 3 and 4, steps 95 may be formed by welding suitable plates and gussets in an opening in each tank. A second step 96 may be secured to the frame or to the top of the tank almost flush on the right-hand side of the vehicle.

The tractor frame 10 is, as illustrated, provided with a conventional fifth wheel W and it also carries an air tank 118 for storing air for the brake system and the like.

Appropriate ventilating means may be provided for the cab and such other changes as may be necessary may be made in the vehicle to facilitate its use and improve its comfort for the drivers. As shown in FIGURE 1, a ventilator 119 in the cowl 29 may be provided on the driver's side. This ventilator together with the offset relation of the engine hood keeps the driver's feet and legs cool. A fresh air inlet 120 which may be connected to the heater is provided in the cowl portion 29a.

It will be understood that many components of the vehicle are susceptible to wide modification, as, for example, the spring suspension, the type of engine and transmission, the details of structure and design and appearance of the hood, cab and the like. Accordingly, the vehicle described herein should be considered as illustrative and not as limiting the scope of the following claims.

We claim:

1. A vehicle having a frame, an engine mounted on the front portion of said frame substantially symmetrically with relation to the longitudinal center line of said frame, a hood mounted on the front of said frame for hinging movement on an axis extending transversely of said frame between engine-covering and engine-uncovering positions, said hood being positioned substantially symmetrically with respect to said center line and covering a front portion of the engine when in said covering position, a driver's cab having a floor and forward and rearward walls mounted on said frame rearwardly of said hood, a tunnel disposed in said cab for the rear end portion of said engine, said tunnel extending rearwardly from said forward wall and having a rear end spaced from said rearward wall of said cab, said cab being offset with respect to said center line and having one sidewall adjacent to said tunnel and an opposite sidewall spaced from said tunnel to provide a space therebetween, driver's controls in said space, and drivers' seats in said cab spaced rearwardly from said tunnel and generally in side by side relation, one of said seats being located between said rear end of said tunnel and said rearward wall.

2. The vehicle set forth in claim 1 comprising an air cleaner for said engine and means mounting said air cleaner on the exterior of said one side wall with the outermost surface of said air cleaner and said other side wall of said cab spaced substantially symmetrically from the longitudinal center line of said frame.

3. The vehicle set forth in claim 2 comprising braces mounted on and extending outwardly from said air cleaner and a rear-view mirror mounted on said braces.

References Cited by the Examiner

UNITED STATES PATENTS

| | | | |
|---|---|---|---|
| 1,598,868 | 9/26 | Lundelius | 180—69 |
| 1,856,005 | 4/32 | Tomshow | 180—1 |
| 2,151,229 | 3/39 | Piroumoff et al. | 180—54 |
| 2,188,891 | 1/40 | Haltenberger | 180—69 |
| 2,332,377 | 10/43 | Haltenberger | 180—69 |
| 2,699,223 | 1/55 | Brumbaugh | 180—89 |
| 2,740,487 | 4/56 | Murty et al. | 180—89 |
| 2,769,501 | 11/56 | Wagner | 180—89 X |
| 2,781,102 | 2/57 | Prichard | 180—89 |
| 2,808,892 | 10/57 | Walker | 180—1 |
| 2,845,133 | 7/58 | Norrie et al. | 180—69 |
| 3,017,944 | 1/62 | Norrie | 180—69 |

FOREIGN PATENTS

| | | |
|---|---|---|
| 771,619 | 4/57 | Great Britain. |
| 792,698 | 4/58 | Great Britain. |
| 1,166,006 | 6/58 | France. |
| 636,586 | 2/62 | Canada. |

PHILIP ARNOLD, *Primary Examiner.*

A. HARRY LEVY, *Examiner.*